US011197063B2

(12) United States Patent
Burkart et al.

(10) Patent No.: US 11,197,063 B2
(45) Date of Patent: Dec. 7, 2021

(54) METHODS, SYSTEMS, AND MEDIA FOR MODIFYING THE PRESENTATION OF VIDEO CONTENT ON A USER DEVICE BASED ON A CONSUMPTION OF THE USER DEVICE

(71) Applicant: Google LLC, Mountain View, CA (US)

(72) Inventors: Joshua Burkart, Oakland, CA (US); Christian Weitenberner, Venice, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/345,877

(22) PCT Filed: Nov. 11, 2016

(86) PCT No.: PCT/US2016/061612
§ 371 (c)(1),
(2) Date: Apr. 29, 2019

(87) PCT Pub. No.: WO2018/089015
PCT Pub. Date: May 17, 2018

(65) Prior Publication Data
US 2019/0261053 A1    Aug. 22, 2019

(51) Int. Cl.
*H04N 21/466*    (2011.01)
*H04N 21/442*    (2011.01)
(Continued)

(52) U.S. Cl.
CPC ......... *H04N 21/4667* (2013.01); *G06F 16/40* (2019.01); *H04N 21/439* (2013.01); *H04N 21/44204* (2013.01)

(58) Field of Classification Search
CPC ............. H04N 21/4667; H04N 21/439; H04N 21/44204; G06F 16/40; H04W 4/18;
(Continued)

(56) References Cited

U.S. PATENT DOCUMENTS

2008/0320545 A1 * 12/2008 Schwartz ........... H04N 21/8541
725/135
2014/0150002 A1 * 5/2014 Hough ............. H04N 21/25891
725/9

(Continued)

FOREIGN PATENT DOCUMENTS

WO    1999036918    7/1999

OTHER PUBLICATIONS

Examination Report dated Apr. 15, 2020 in EP Patent Application No. 16802212.7.

(Continued)

*Primary Examiner* — Alazar Tilahun
(74) *Attorney, Agent, or Firm* — Byrne Poh LLP (57) ABSTRACT

Methods, systems, and media for modifying the presentation of video content on a user device based on a consumption mode of the user device are provided. In some embodiments, a computer-implemented method comprises: receiving, from a user device, a request to present a video content item, wherein the video content item includes an audio portion; identifying a segment of the audio portion as including a particular type of audio content (e.g., silent content, music content, speech content, theatrical content, non-musical content, etc.); determining a consumption mode associated with the user device; generating a modified video content item based on the consumption mode associated with the user device by removing a portion of the video content item that corresponds to the segment of the audio portion identified as including the particular type of audio content; and causing the modified video content item to be presented on the user device.

33 Claims, 6 Drawing Sheets

(51) Int. Cl.
*H04N 21/439* (2011.01)
*G06F 16/40* (2019.01)

(58) Field of Classification Search
CPC . H04L 65/602; H04L 65/605; H04L 65/4076; H04L 65/4084
See application file for complete search history.

(56) References Cited

U.S. PATENT DOCUMENTS

2015/0149583 A1* 5/2015 Chung ................ G06F 16/435
709/217
2015/0288991 A1 10/2015 Tisher et al.

OTHER PUBLICATIONS

Examination Report dated Mar. 15, 2021 in IN Patent Application No. 201947019674.

* cited by examiner

METHODS, SYSTEMS, AND MEDIA FOR MODIFYING THE PRESENTATION OF VIDEO CONTENT ON A USER DEVICE BASED ON A CONSUMPTION OF THE USER DEVICE

TECHNICAL FIELD

The disclosed subject matter relates to methods, systems, and media for modifying the presentation of video content on a user device based on a consumption mode of the user device.

BACKGROUND

People frequently view videos on user devices, such as mobile phones, tablet computers, laptop computers, televisions, etc. These videos often include content such as music videos, where a user may request the music video for presentation on the device, but only listens to the audio content associated with the video without watching the video content. A provider of the video, such as a media content sharing service that hosts the video, may want to provide only the audio content corresponding to the video. However, it can be difficult to identify situations in which only the audio content should be provided. Furthermore, in many cases, the creator or editor of the video content item does not trim the video content item, so that the audio portion of a video content item may contain types of audio content that are not wanted if the user wishes to receive only the audio content.

Accordingly, it is desirable to provide methods, systems, and media for modifying presentation of video content on a user device based on a consumption mode of the user device.

SUMMARY

Methods, systems, and media for modifying the presentation of video content on a user device based on a consumption mode of the user device are provided.

In accordance with some embodiments of the disclosed subject matter, a computer-implemented method for presenting video content is provided, the method comprising: receiving, from a user device, a request to present a video content item, wherein the video content item includes an audio portion; identifying a first time position of the audio portion that corresponds to a first type of audio content in the audio portion and a second time position of the audio portion that corresponds to a second type of audio content in the audio portion; determining a consumption mode associated with the user device; generating a modified video content item based on the consumption mode associated with the user device by removing a portion of the video content item that corresponds to a time between the first time position and the second time position; and causing the modified video content item to be presented on the user device. It should be noted that the portion of the video content item that is removed may be an intermediate portion of the video content item, or it may be at the start or finish of the video content item.

In accordance with other embodiments of the disclosed subject matter, a computer-implemented method for presenting video content is provided, the method comprising: receiving, from a user device, a request to present a video content item, wherein the video content item includes an audio portion; identifying a first time position of the video content item that corresponds to a transition from a first type of audio content in the audio portion to a second type of audio content in the audio portion and a second time position of the video content item; determining a consumption mode associated with the user device; generating a modified video content item based on the consumption mode associated with the user device by removing a portion of the video content item that corresponds to a time between the first time position and the second time position; and causing the modified video content item to be presented on the user device. In some embodiments, the second time position is later than the first time position, so that the portion of the video content item removed contains the second type of audio content. The second time may, for example, be a time which corresponds to a transition from the second type of audio content in the audio portion back to the first type of audio content in the audio portion (or which corresponds to a transition from the second type of audio content in the audio portion to a third type of audio content in the audio portion), so that the removed portion of the video content item is an intermediate portion of the video content item. Alternatively, the second time may correspond to an end of the video content item. In some embodiments, the second time position may be earlier than the first time position and may correspond to the start of the video content item. Other embodiments of the disclosed subject matter provide a corresponding system and a computer readable medium containing computer-executable instructions that, when executed by a processor, cause the processor to perform a method of this embodiment.

In some embodiments, determining the consumption mode associated with the user device is based on user input from a user of the user device, and the modified video content item is generated in response to determining that the user input indicates that the user is listening to the audio portion without viewing video content associated with the video content item.

In some embodiments, determining the consumption mode associated with the user device comprises determining whether an application presenting the video content item is executing in the background of the user device, and the modified video content is generated in response to determining that the application is executing in the background of the user device.

In some embodiments, the first type of audio content in the audio portion corresponds to silence and the second type of audio content in the audio portion corresponds to music. In some embodiments, identifying that the first type of audio content in the audio portion corresponds to silence comprises determining that a loudness level of the audio portion is below a predetermined threshold level.

In some embodiments, the first type of audio content in the audio portion corresponds to speech content or non-musical audio content and the second type of audio content in the audio portion corresponds to music.

In some embodiments, the method further comprises: determining that the modified video content item is not to be presented based on the consumption mode associated with the user device; and storing the modified video content item in response to determining that the modified video content item is not to be presented.

In some embodiments, the method further comprises calculating a confidence value associated with the consumption mode, wherein the modified video content item is generated in response to determining that the confidence value is greater than a predetermined threshold.

In some embodiments, the method further comprises causing a second video content item to be presented on the user device, wherein the removed portion of the video content item corresponds to silent audio content at an ending portion of the video content item.

In accordance with some embodiments of the disclosed subject matter, a system for presenting video content is provided, the system comprising: a memory storing computer-executable instructions; and a hardware processor that, when executing the computer-executable instructions stored in the memory, is configured to: receive, from a user device, a request to present a video content item, wherein the video content item includes an audio portion; identify a first time position of the audio portion that corresponds to a first type of audio content in the audio portion and a second time position of the audio portion that corresponds to a second type of audio content in the audio portion; determine a consumption mode associated with the user device; generate a modified video content item based on the consumption mode associated with the user device by removing a portion of the video content item that corresponds to a time between the first time position and the second time position; and cause the modified video content item to be presented on the user device.

In accordance with some embodiments of the disclosed subject matter, a computer readable medium, which may be a non-transitory computer-readable medium, containing computer-executable instructions that, when executed by a processor, cause the processor to perform a method for presenting video content is provided, the method comprising: receiving, from a user device, a request to present a video content item, wherein the video content item includes an audio portion; identifying a first time position of the audio portion that corresponds to a first type of audio content in the audio portion and a second time position of the audio portion that corresponds to a second type of audio content in the audio portion; determining a consumption mode associated with the user device; generating a modified video content item based on the consumption mode associated with the user device by removing a portion of the video content item that corresponds to a time between the first time position and the second time position; and causing the modified video content item to be presented on the user device.

In accordance with some embodiments of the disclosed subject matter, a system for presenting video content is provided, the system comprising: means for receiving, from a user device, a request to present a video content item, wherein the video content item includes an audio portion; means for identifying a first time position of the audio portion that corresponds to a first type of audio content in the audio portion and a second time position of the audio portion that corresponds to a second type of audio content in the audio portion; means for determining a consumption mode associated with the user device; means for generating a modified video content item based on the consumption mode associated with the user device by removing a portion of the video content item that corresponds to a time between the first time position and the second time position; and means for causing the modified video content item to be presented on the user device.

In accordance with some embodiments of the disclosed subject matter, a computer-implemented method for presenting video content is provided, the method comprising: receiving, from a user device, a request to present a video content item, wherein the video content item includes an audio portion; identifying a segment of the audio portion as including a particular type of audio content; determining a consumption mode associated with the user device; generating a modified video content item based on the consumption mode associated with the user device by removing a portion of the video content item that corresponds to the segment of the audio portion identified as including the particular type of audio content; and causing the modified video content item to be presented on the user device.

In some embodiments, determining the consumption mode associated with the user device is based on user input from a user of the user device, and the modified video content item is generated in response to determining that the user input indicates that the user is listening to the audio portion without viewing video content associated with the video content item.

In some embodiments, determining the consumption mode associated with the user device comprises determining whether an application presenting the video content item is executing in the background of the user device, and the modified video content is generated in response to determining that the application is executing in the background of the user device.

In some embodiments, the particular type of audio content in the audio portion corresponds to silence. In some embodiments, identifying that the particular type of audio content in the audio portion corresponds to silence comprises determining that a loudness level of the audio portion is below a predetermined threshold level.

In some embodiments, the particular type of audio content in the audio portion corresponds to speech.

In some embodiments, the method further comprises: determining that the modified video content item is not to be presented based on the consumption mode associated with the user device; and storing the modified video content item in response to determining that the modified video content item is not to be presented.

In some embodiments, the method further comprises calculating a confidence value associated with the consumption mode, wherein the modified video content item is generated in response to determining that the confidence value is greater than a predetermined threshold.

In some embodiments, the method further comprises causing a second video content item to be presented on the user device, wherein the removed portion of the video content item corresponds to silent audio content at an ending portion of the video content item.

In some embodiments, the identified segment of the audio portion corresponds to an intermediate portion of the video content item, and wherein the particular type of audio content is non-musical audio content.

In some embodiments, the segment of the audio portion is identified based on an output of a classifier, and wherein the output of the classifier is based on manually classified training data from a plurality of content segments.

In accordance with some embodiments of the disclosed subject matter, a system for presenting video content is provided, the system comprising: a memory storing computer-executable instructions; and a hardware processor that, when executing the computer-executable instructions stored in the memory, is configured to: receive, from a user device, a request to present a video content item, wherein the video content item includes an audio portion; identify a segment of the audio portion as including a particular type of audio content; determine a consumption mode associated with the user device; generate a modified video content item based on the consumption mode associated with the user device by removing a portion of the video content item that corresponds to the segment of the audio portion identified as including the particular type of audio content; and cause the modified video content item to be presented on the user device.

In accordance with some embodiments of the disclosed subject matter, a computer readable medium, which may be a non-transitory computer-readable medium, containing computer-executable instructions that, when executed by a processor, cause the processor to perform a method for presenting video content is provided, the method comprising: receiving, from a user device, a request to present a video content item, wherein the video content item includes an audio portion; identifying a segment of the audio portion as including a particular type of audio content; determining a consumption mode associated with the user device; generating a modified video content item based on the consumption mode associated with the user device by removing a portion of the video content item that corresponds to the segment of the audio portion identified as including the particular type of audio content; and causing the modified video content item to be presented on the user device.

In accordance with some embodiments of the disclosed subject matter, a system for presenting video content is provided, the system comprising: means for receiving, from a user device, a request to present a video content item, wherein the video content item includes an audio portion; means for identifying a segment of the audio portion as including a particular type of audio content; means for determining a consumption mode associated with the user device; means for generating a modified video content item based on the consumption mode associated with the user device by removing a portion of the video content item that corresponds to the segment of the audio portion identified as including the particular type of audio content; and means for causing the modified video content item to be presented on the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for modifying the presentation of video content on a user device based on a consumption mode of the user device are provided.

In some embodiments, the mechanisms described herein can cause one or more portions of a video content item to be removed and/or skipped during the presentation of the video content item on a user device based on a determined consumption mode associated with the user device. For example, in some embodiments, the consumption mode associated with the user device can indicate whether a user of the user device is watching the video content item or listening to audio content corresponding to the video content item without watching the video content item.

In some embodiments, the portions of the video content item that are removed and/or skipped during presentation of the video content item can be portions of the video content item that correspond to particular types of audio content. For example, in instances where the video content item is a music video, the portions of the video content item that are skipped can correspond to audio content that include silences, laughter, speech, and/or other non-musical audio content. As a specific example, in instances where the video content item is a music video, the mechanisms described herein can determine whether a user of the user device is watching the video, and, in response to determining that the user is not watching the video, can present a modified version of the video content item that does not include portions of the video content item that correspond to silences, laughter, speech, and/or other non-musical audio content. Alternatively, the mechanisms described herein can cause the video content item to be presented in an unmodified form (e.g., including non-musical audio content) in response to determining that the user of the user device is watching the video.

For example, in response to determining that the consumption mode associated with the user device indicates that the user of the user device is listening to audio content corresponding to the video content item without watching the video content item, the mechanisms can cause silences, intros, outros, interludes, and/or other non-musical portions of the video content item (e.g., theatrical portions of the video content item that are deemed to be non-musical) to be skipped, thereby creating a continuous media playback session. In a more particular example, when playing back a playlist that includes multiple video content items, the mechanisms can, based on the consumption mode, present a music portion of a first video content item, skip over a silent outro portion of the first video content item (e.g., without user intervention), skip over a silent intro portion of a second video content item that follows the first video content item in sequence (e.g., also without user intervention), and present a music portion of the second video content item. In this example, the outro of the first video content item and the intro of the second video content item may be portions that should have been cut or trim by a video editor prior to uploading the video content items to a content server. In continuing this example, the mechanisms can, based on the consumption mode indicating that the user of the user device is likely to be watching video content items, present unmodified video content items from the playlist in its original format.

It should be noted that the portion of the video content item that is removed and/or skipped may be an intermediate portion of the video content item, or it may be at the start or finish of the video content item.

In some embodiments, the mechanisms described herein can determine the consumption mode associated with the user device using any suitable technique or combination of techniques. For example, in some embodiments, one or more portions of the video content item can be removed and/or skipped in response to determining that a user has provided an indication (e.g., via a user interface) that the user is listening to audio content associated with a video content item without viewing the corresponding video content. As another example, in some embodiments, one or more portions of the video content item can be removed and/or skipped in response to determining that an application or a browser window user to present the video content is currently a background operating process on the user device. As yet another example, in some embodiments, one or more portions of the video content item can be removed and/or skipped in response to determining that a user of the user device is not viewing a display of the user device (e.g., based on information from a camera associated with the user device) during presentation of the video content item. As still another example, in some embodiments, one or more portions of the video content item can be removed and/or skipped in response to determining that the user device is currently in motion (e.g., based on information from an accelerometer associated with the user device, based on location information associated with the user device, and/or based on any other suitable information).

In some embodiments, the mechanisms described herein can remove and/or skip one or more portions of the video content item using any suitable technique(s). For example, in some embodiments, time points associated with particular types of audio content corresponding to the video content item (e.g., silence, speech, laughter, music, and/or any other suitable type of audio content) can be identified and stored (e.g., in a database, and/or in any other suitable location) for later use. The mechanisms can then determine that one or more particular portions of the video content item are to be removed and/or skipped, and can generate a modified video content item by removing a portion of the video content item that is between a first identified time point (e.g., a beginning of a silent audio portion, a beginning of an audio portion that includes speech, and/or any other suitable content) and a second identified time point (e.g., a beginning of a musical audio portion, an ending of a silent audio portion, and/or any other suitable content).

Such mechanisms can, for example, modify the music playback by removing unwanted content, for example, distracting and unexpected content (e.g., silences and non-musical interludes). Furthermore, in instances where the unwanted, distracting, and/or unexpected content (e.g., silences and non-musical interludes) are included in the video content item due to production errors (e.g., inaccuracy in trimming unwanted portions of the content item during video and audio processing of the content item, and/or any other types of errors), the mechanisms can allow the content item to be further edited prior to presentation. Additionally, such mechanisms can allow user devices to use less bandwidth and less data when streaming video content items by causing only audio content or selected portions of content to be streamed to the user device when it is determined that a user is not watching the associated video content. As such, using less bandwidth, less data, and/or fewer computation resources can, in turn, conserve power of a power source associated with a mobile device, such as an internal battery.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

Figure 1:
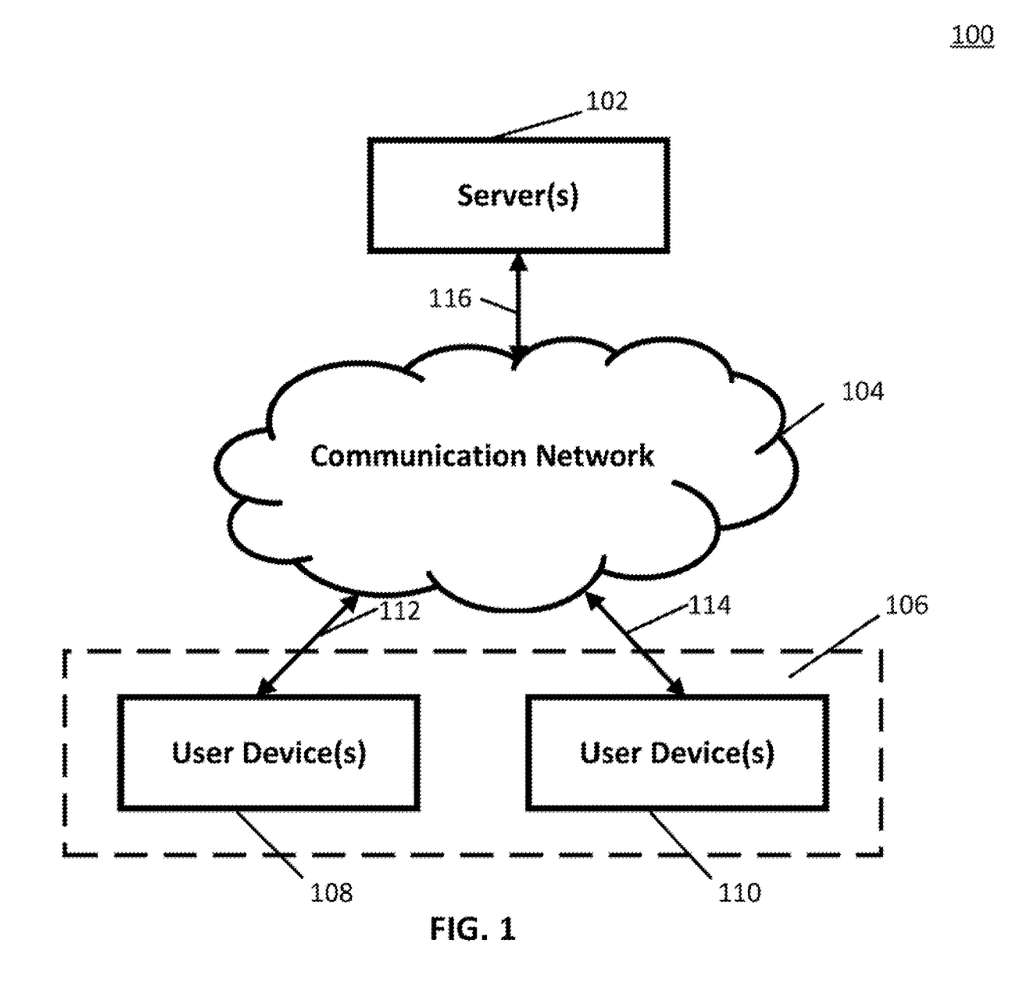
FIG. 1 shows a schematic diagram of an illustrative system suitable for implementation of mechanisms described herein for modifying the presentation of video content on a user device based on a consumption mode of the user device in accordance with some embodiments of the disclosed subject matter.

Turning to FIG. 1, an example 100 of hardware for modifying the presentation of video content on a user device based on a consumption mode of the user device that can be used in accordance with some embodiments of the disclosed subject matter is shown. As illustrated, hardware 100 can include one or more servers such as a server 102, a communication network 104, and/or one or more user devices 106, such as user devices 108 and 110.

In some embodiments, server(s) 102 can be any suitable server(s) for storing video content, transmitting video content to a user device 106 via communication network 104, modifying a presentation of video content on user device 106 based on a consumption mode associated with user device 106, and/or performing any other suitable functions. For example, in some embodiments, server 102 can store time points that indicate portions of a video content item that correspond to particular types of audio content, such as silence, music, speech, laughter, and/or any other suitable type of audio content. For example, server 102 may store information indicating the type of audio content at each of multiple time points in the video content item, for example, regularly spaced time points. Additionally or alternatively, server 102 can store time points that correspond to transitions between one particular type of audio content and another, different type of audio. As shown in and described below in connection with FIGS. 3 and 4, server 102 can determine whether a user of user device 106 is viewing video content on user device 106 during presentation of the video content item, and, in response to determining that the user is listening to the video content without viewing a display associated with user device 106, server 102 can remove portions of the video content item that correspond to particular types of audio content (e.g., silence, non-musical portions, and/or any other suitable type of audio content). It should be noted that, in some embodiments, server 102 can receive an indication from a media playback device that the user has activated the media playback device for presenting particular types of audio content (e.g., a device that received a speech command of "play me as song by Artist A" as opposed to playing back a video item on a display device connected to the media playback device). As a more particular example, in some embodiments, in response to determining that a user is not viewing the display during presentation of a music video, server 102 can cause any non-musical portions of the music video to be removed prior to presentation of the music video on user device 106.

Communication network 104 can be any suitable combination of one or more wired and/or wireless networks in some embodiments. For example, communication network 104 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 106 can be connected by one or more communications links 112 and/or 114 to communication network 104 that can be linked via one or more communications links (e.g., communications link 116) to server(s) 102. Communications links 112, 114, and/or 116 can be any communications links suitable for communicating data among user devices 106 and server(s) 102 such as network links, dial-up links, wireless links, hard-wired links, any other suitable communications links, or any suitable combination of such links.

In some embodiments, user devices 106 can include one or more computing devices suitable for requesting video content, viewing video content, listening to video content, and/or any other suitable functions. For example, in some embodiments, user devices 106 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 106 can be implemented as a non-mobile device such as a desktop computer, a set-top box, a television, a streaming media player, a game console, and/or any other suitable non-mobile device. For example, user device 106 can include a mobile device that is capable of playing back video content and/or any suitable portion of the video content. In another example, user device 106 can include a media playback device that is connected to various media devices, such as a display device capable of presenting video content items, an audio device capable of presenting audio content of the video content item, etc.

Although server 102 is illustrated as a single device, the functions performed by server 102 can be performed using any suitable number of devices in some embodiments. For example, in some embodiments, multiple devices can be used to implement the functions performed by server 102.

Although two user devices 108 and 110 are shown in FIG. 1, any suitable number of user devices, and/or any suitable types of user devices, can be used in some embodiments.

Server(s) 102 and user devices 106 can be implemented using any suitable hardware in some embodiments. For example, in some embodiments, devices 102 and 106 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Figure 2:
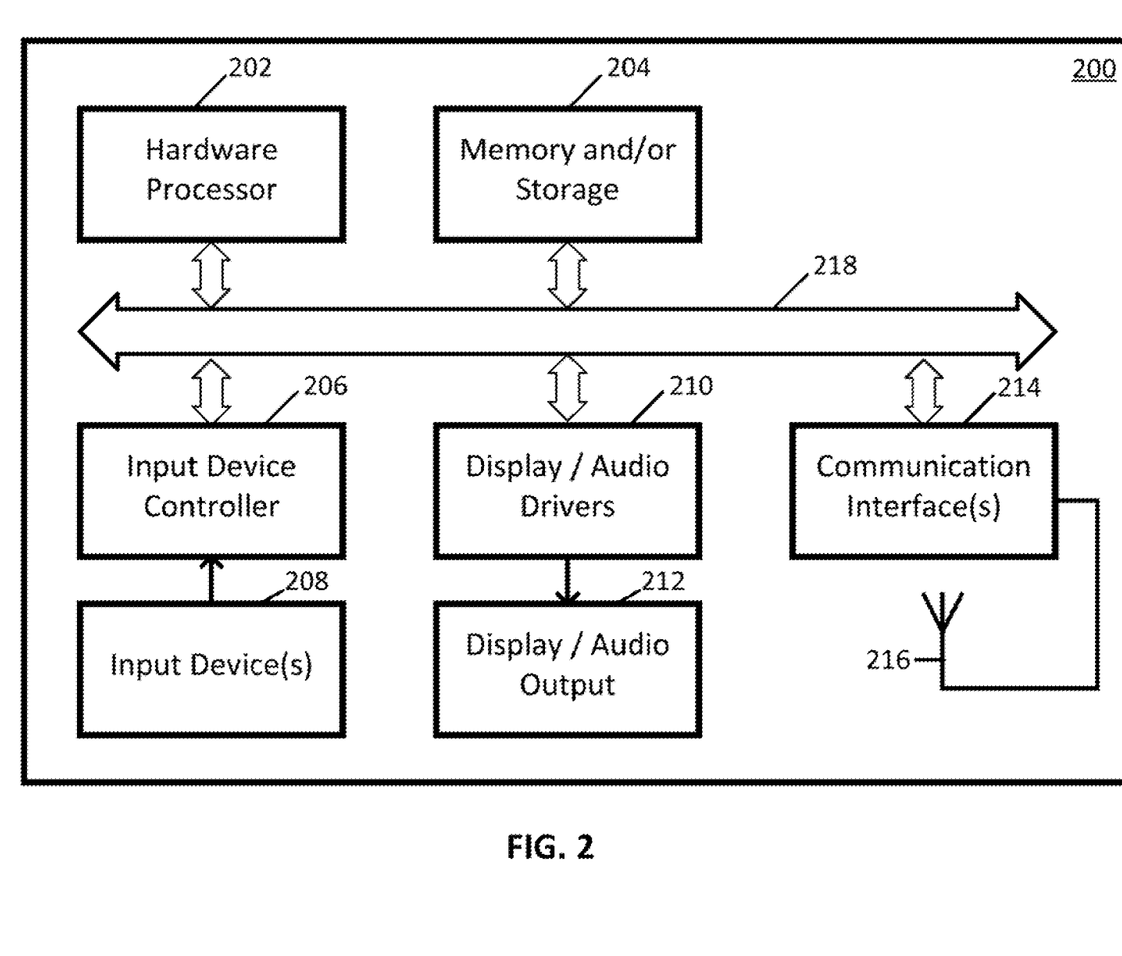
FIG. 2 shows a detailed example of hardware that can be used in a server and/or a user device of FIG. 1 in accordance with some embodiments of the disclosed subject matter.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 202 can be controlled by a server program stored in memory and/or storage 204 of a server (e.g., such as server 102). For example, the server program can cause hardware processor 202 to transmit video content to user device 106, remove portions of a video content item corresponding to silence or non-musical content, and/or perform any other suitable actions. In some embodiments, hardware processor 202 can be controlled by a computer program stored in memory and/or storage 204 of user device 106. For example, the computer program can cause hardware processor 202 to request video content, present video content, and/or perform any other suitable actions.

Memory and/or storage 204 can be any suitable memory and/or storage for storing programs, data, media content, advertisements, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 104) in some embodiments. In some embodiments, antenna 216 can be omitted.

Bus 218 can be any suitable mechanism for communicating between two or more components 202, 204, 308, 210, and 214 in some embodiments.

Any other suitable components can be included in hardware 200 in accordance with some embodiments.

Figure 3:
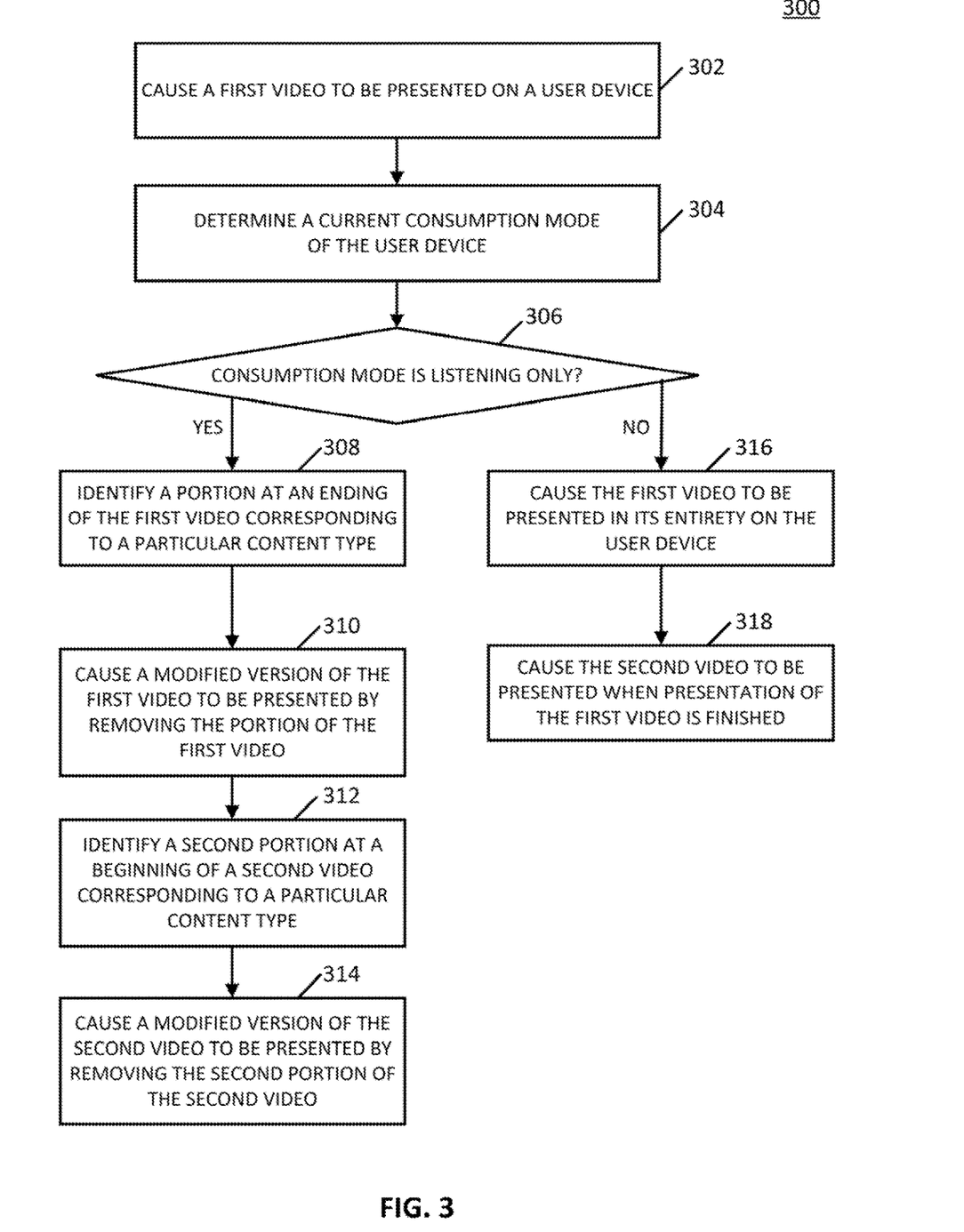
FIG. 3 shows an illustrative example of a process for transitioning between two video content items based on a consumption mode of the user device in accordance with some embodiments of the disclosed subject matter.

Turning to FIG. 3, an example 300 of a process for transitioning between presentation of two videos based on a consumption mode is shown in accordance with some embodiments of the disclosed subject matter.

Process 300 can begin by causing a first video content item to be presented on a user device at 302. In some embodiments, the video content item can be any suitable type of video content, such as a music video, a movie, a television program, live-streamed content, and/or any other suitable type of content. In some embodiments, process 300 can cause the first video content item to be presented using any suitable technique or combination of techniques. For example, in some embodiments, process 300 can cause server(s) 102 to stream the first video content item to user device 106, which can then present the received first video content item.

At 304, process 300 can determine a consumption mode associated with the user device. In some embodiments, the consumption mode can indicate whether a user of the user device is viewing a display associated with the user device. For example, in some embodiments, the consumption mode can indicate whether the user of the user device is watching the first video content item on the display associated with the user device or, alternatively, if the user of the user device is listening to audio content associated with the first video content item without watching the display associated with the user device. Additionally, in some embodiments, process 300 can calculate a confidence value associated with the determined consumption mode. For example, in some embodiments, the confidence value can indicate a likelihood or probability that the determined consumption mode is correct.

Process 300 can determine the consumption mode associated with the user device using any suitable information and any suitable technique(s). For example, in some embodiments, process 300 can determine the consumption mode based on information supplied by a user of the user device. As a more particular example, in some embodiments, process 300 can determine whether the user of the user device has selected an input (e.g., in an application used to view the first video content item, in a user interface used to present the first video content item, and/or in any other suitable location) that indicates that the user is listening to audio content associated with video content items without watching the corresponding video content. In some such embodiments, the input can be any suitable type of selectable user interface control, such as a toggle, a radio button, a checkbox, and/or any other suitable type of selectable input.

As another example, in some embodiments, process 300 can determine the consumption mode based on whether an application used to present the first video content item and/or a browser window used to present the first video content item is in the foreground of executing processes on the user device. As a more particular example, in instances where process 300 determines that the application or browser window is in the foreground of the user device, process 300 can determine that the consumption mode is to indicate that the user of the user device is likely to be viewing a display associated with the user device (e.g., the screen of the user device, a monitor or television connected to or coupled to the user device, and/or any other suitable display). As another more particular example, in instances where process 300 determines that the application or browser window is executing in the background of the user device, process 300 can determine that the consumption mode is to indicate that the user of the user device is likely to not be viewing a display associated with the user device.

As yet another example, in some embodiments, process 300 can determine the consumption mode based on information from a camera associated with the user device. As a more particular example, in some embodiments, process 300 can use the camera to determine whether a user of the user device is currently looking at a display associated with the user device, for example, by detecting an eye-gaze, and/or using any other suitable information. As a specific example, in instances where process 300 determines that the user is looking at the display, process 300 can determine that the consumption mode is to indicate that the user is watching the video content. As another specific example, in instances where process 300 determines that the user is not looking at the display, process 300 can determine that the consumption mode is to indicate that the user is listening to audio content associated with the video content item without watching the corresponding video content. As another more particular example, in instances where information recorded from the camera indicates that the user device is in a pocket or handbag of the user (e.g., in response to determining that images recorded by the camera are dark, and/or based on any other suitable information), process 300 can determine that the consumption mode is to indicate that the user is listening to audio content without viewing the corresponding video content.

As still another example, in some embodiments, process 300 can determine the consumption mode based on motion and/or orientation information associated with the user device. For example, in some embodiments, process 300 can use information recorded from an accelerometer of the user device to determine a current orientation and/or motion pattern associated with the user device. As a more particular example, in instances where the motion pattern indicates that the user device is currently not in motion, process 300 can determine that the consumption mode is to indicate that a user of the user device is viewing the video content of the presented video content item. As another more particular example, in instances where the motion pattern indicates that a user of the user device is currently walking and/or running with the user device, process 300 can determine that the consumption mode is to indicate that the user is listening to audio content associated with the video without viewing the corresponding video content.

In some embodiments, process 300 can calculate the confidence value associated with the consumption mode determination using any suitable information and technique(s). For example, in some embodiments, process 300 can combine information from multiple factors (e.g., explicit user input(s), information indicating whether an application or browser window is in the foreground of operation on the user device, information from a camera and/or accelerometer of the user device, and/or any other suitable information). In some such embodiments, process 300 can calculate the confidence value based on whether the information from the multiple factors is in agreement. As a more particular example, in an instance where information from the camera indicates that the user device is in a pocket of the user and information from the accelerometer indicates that the user of the user device is walking with the user device, process 300 can calculate a relatively higher confidence value (e.g., 70%, 80%, 90%, and/or any other suitable probability) associated with a consumption mode that indicates that the user is listening to audio content associated with the video without viewing the corresponding video content. In some embodiments, information from different factors can be weighted differently when calculating the confidence value. For example, in some embodiments, explicit user input(s) can be accorded a relatively high weight relative to other information sources (e.g., information from the camera and/or accelerometer, and/or any other suitable information).

Note that, in some embodiments, process 300 can update a determination of the current consumption mode at any suitable frequency (e.g., every thirty seconds, every two minutes, every five minutes, and/or any other suitable frequency). In some embodiments, the confidence value can be based on multiple sequential determinations of the consumption mode. For example, in instances where more than a predetermined number (e.g., more than two, more than five, and/or any other suitable number) of determinations of the consumption mode have been in agreement, process 300 can determine the confidence value to be relatively higher than in instances where the determinations of the consumption mode have not been in agreement.

At 306, process 300 can determine whether the consumption mode indicates that the user is listening to audio content associated with the first video content item without viewing the corresponding video content. For example, in some embodiments, process 300 can determine whether the confidence value associated with a consumption mode indicating that the user is listening to the audio content is greater than a predetermined threshold (e.g., greater than 50%, greater than 70%, greater than 90%, and/or any other suitable threshold). Note that in instances where the confidence value is lower than a predetermined threshold (e.g., lower than 50%, lower than 40%, lower than 30%, and/or any other suitable threshold), process 300 can determine that the consumption mode is to be set to a default consumption mode. For example, in some embodiments, the default consumption mode can indicate that the user is viewing the video content associated with the video content item (e.g., such that video content items in their original format are presented).

If, at 306, process 300 determines that the consumption mode indicates that the user is listening to audio content without viewing the corresponding video content ("yes" at 306), process 300 can proceed to block 308 and can identify a portion at an ending of the first video content item that corresponds to a particular type of audio content. For example, in some embodiments, the particular type of audio content can include silence, speech, laughter, non-musical content, musical content, and/or any other suitable type of audio content. Process 300 can use any suitable technique or combination of techniques to identify the particular type of audio content. For example, in some embodiments, process 300 can access data corresponding to the first video content item that indicates time points of the audio portion of the first video content item that correspond to different types of audio content. As a more particular example, in some embodiments, the data can indicate that the first video content item has a duration of 3 minutes and 10 seconds, and the last 4 seconds of the audio content is silent. In some embodiments, the data can be pre-computed and stored in association with the first video content item. More detailed techniques for analyzing the audio content of the first video content item are described below in connection with block 404 of FIG. 4.

It should be noted that, in some embodiments, the user of the user device can indicate particular types of audio content to be skipped and/or removed from presentation for a particular consumption mode. For example, the user of the user device can receive an interface during the presentation of a video content item that prompts the user to provide an input indicating whether an identified type of audio content (e.g., a silent portion, a portion containing theatrical and non-musical content, a portion containing speech, etc.) should be skipped and/or removed from presentation during subsequent media playback sessions where the consumption mode indicates that the user is not likely to be viewing the video portion of the video content. In continuing this example, the user of the user device can select particular types of audio that are to be skipped and/or removed (e.g., silent portions or portions having a loudness level less than a threshold decibel level) and particular types of audio that are not to be skipped and/or removed (e.g., portions determined to contain speech content or theatrical content within the video content item). In response, such selections can, for example, train process 300 to provide a personalized media playback session where certain types of audio content are to be skipped and/or removed from presentation when a particular consumption mode has been detected.

Alternatively, in some embodiments, the user of the user device can receive a settings interface for indicating the types of audio content that are to be skipped and/or removed from presentation when a particular consumption mode has been detected. For example, an illustrative interface can prompt the user to select one or more types of audio content from a list of audio content types, such as portions determined to contain silence, portions determined to have a loudness level that is less than a particular user-selected decibel level, portions determined to contain speech, portions determined to contain laughter, portions determined to contain theatrical content, etc. In response to such selections in the settings interface, process 300 can determine whether video content items contain particular types of audio content based on the user selections.

At 310, process 300 can cause a modified version of the first video content item to be presented by removing the portion of the first video content item corresponding to the particular type of audio content (e.g., silence, laughter, speech, and/or any other suitable type of audio content) and causing the modified version of the first video content item to be presented on the user device. Process 300 can use any suitable technique or combination of techniques to generate the modified version of the first video content item. For example, in some embodiments, a modified version of the first video content item with the portion of the first video content item removed can be generated prior to presentation of the first video content item (e.g., generated asynchronously and stored on server(s) 102 for future use), and process 300 can transmit the modified version in response to determining at block 306 that the user is listening to the audio content without viewing the corresponding video content. As another example, in some embodiments, process 300 can trim the portion of the first video content item corresponding to the particular type of audio content and can save the trimmed content item as a new content item. In some embodiments, the modified version of the first video content item can be a content item with audio content only. In instances where process 300 is streaming the first video content item to the user device, process 300 can switch to streaming the modified version of the first video content item to the user device via communication network 104.

At 312, process 300 can identify a second portion at a beginning of a second video content item corresponding to a particular type of audio content (e.g., silence, laughter, speech, and/or any other suitable type of audio content). In some embodiments, the second video content item can be any suitable video content item. For example, in some embodiments, the second video content item can be a video content item included after the first video content item in a playlist or collection of video content items being presented on the user device. As described above in connection with block 308, process 300 can use any suitable information and technique(s) to identify the particular types of audio content and corresponding time points within the second video content item that include the particular type(s) of audio content.

At 314, process 300 can cause a modified version of the second video content item to be presented by removing the portion of the second video content item corresponding to the particular type of audio content. As described above in connection with block 310, process 300 can generate a new modified version of the second video content item or, alternatively, access a pre-generated modified version of the second video content item. As described above in connection with block 310, the modified version of the second video content item can include audio content only. In some embodiments, process 300 can cause the modified version of the second video content item to be presented in response to determining that presentation of the modified version of the first video content item has finished.

If, at 306, process 300 determined that the user is viewing the video content ("no" at 306), process 300 can proceed to block 316 and can cause the first video content item to be presented in its entirety on the user device. For example, in some embodiments, process 300 can proceed to block 316 if the confidence value associated with a consumption mode indicating that the user is viewing the video content is greater than a predetermined threshold (e.g., greater than 50%, greater than 70%, greater than 90%, and/or any other suitable threshold). In instances where server(s) 102 is streaming the first video content item to the user device, process 300 can cause server(s) 102 to continue streaming the first video content item to the user device via communication network 104.

At 318, process 300 can cause a second video content item (e.g., a subsequent video in a playlist or collection of video content items, and/or any other suitable video content item) to be presented on the user device when presentation of the first video content item has been completed.

Figure 5A:
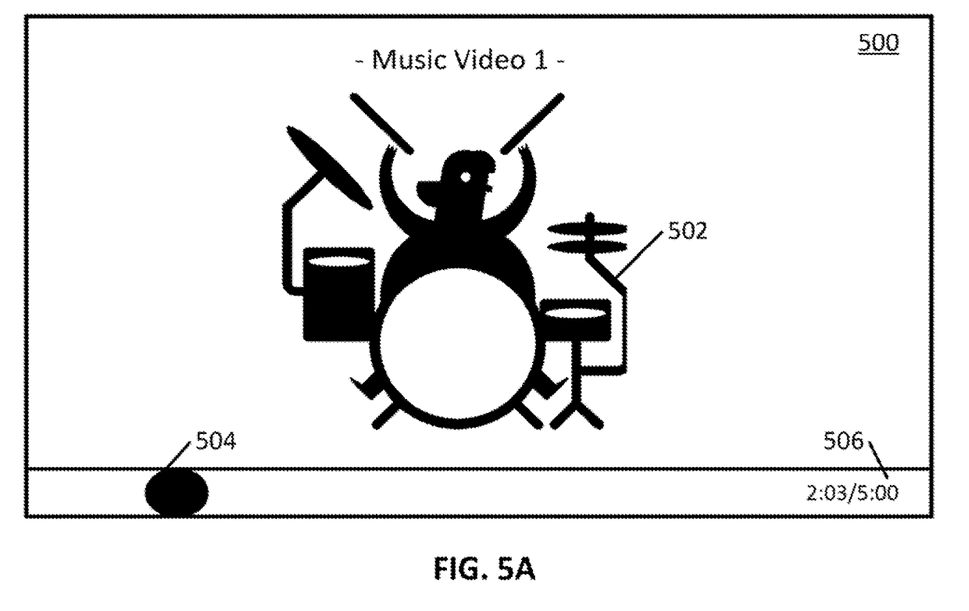
FIGS. 5A-5C show illustrative examples of user interfaces for modifying the presentation of video content on a user device based on a consumption mode of the user device in accordance with some embodiments of the disclosed subject matter.
Figure 5B:
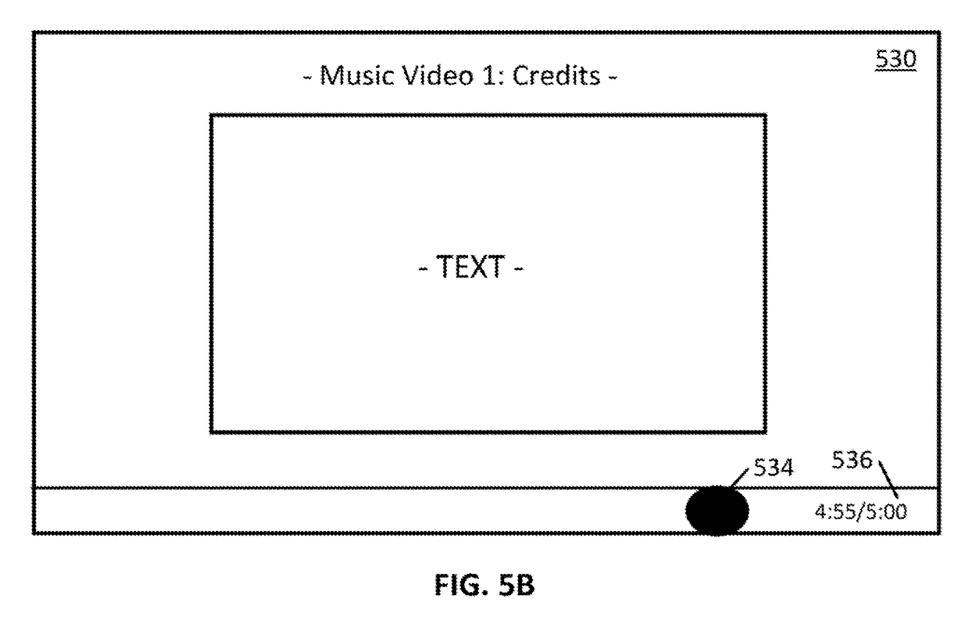
Figure 5C:
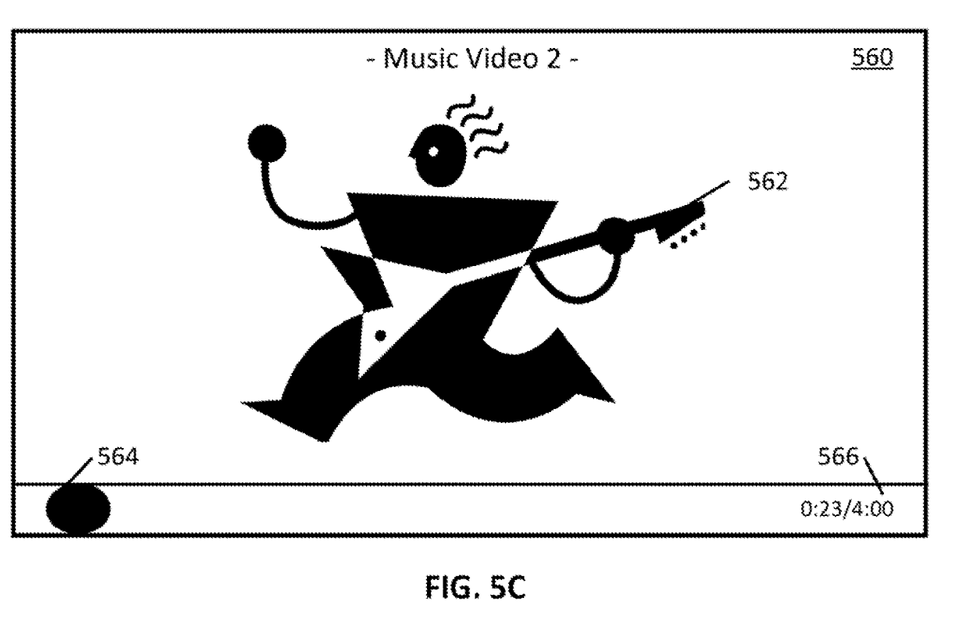

FIGS. 5A-5C show examples of user interfaces for transitioning between two music videos based on a consumption mode of a user device in accordance with some embodiments of the disclosed subject matter. As shown in FIG. 5A, a first video 502 can be presented in user interface 500 on a user device. In some embodiments, the first video can be presented in connection with a video player window, that can indicate a total duration of the first video (e.g., time indicator 504) and a current time point of presentation (e.g., a time point indicator 506). As described above in connection with FIG. 3, in some instances, a music video may have silent portions or non-musical interludes at an ending portion of the music video. For example, as shown in user interface 530 of FIG. 5, the ending portion of the music video (e.g., as indicated by time indicator 534 and time point indicator 536) may include silence in the audio content with the video content showing text that indicates credits associated with the music video, and/or any other suitable video content. In some such instances, as described above in connection with block 316-318 of FIG. 3, the portion of the video corresponding to the silent audio content may be presented if a consumption mode associated with the user device indicates the user is viewing the video content. Conversely, as described above in connection with blocks 308-314 of FIG. 3, the portion of the video content corresponding to the silent audio content may be skipped over if the consumption mode associated with the user device indicates that the user is not viewing the video content. In this example, rather than presenting user interface 530 and the corresponding audio and video content, the system can skip to presenting a second music video 562, as shown in user interface 560 of FIG. 5C. Furthermore, as illustrated in user interface 560 and described above in connection with blocks 312 and 314 of FIG. 3, presentation of second music video 562 can be modified such that video content associated with silent portions and/or non-musical interludes at a beginning portion of second music video 562 are removed and/or skipped over. For example, as indicated by time indicator 564 and time point indicator 566, presentation of second music video 562 can begin at a point of second music video 562 that first includes musical content in the audio portion of second music video 562.

Figure 4:
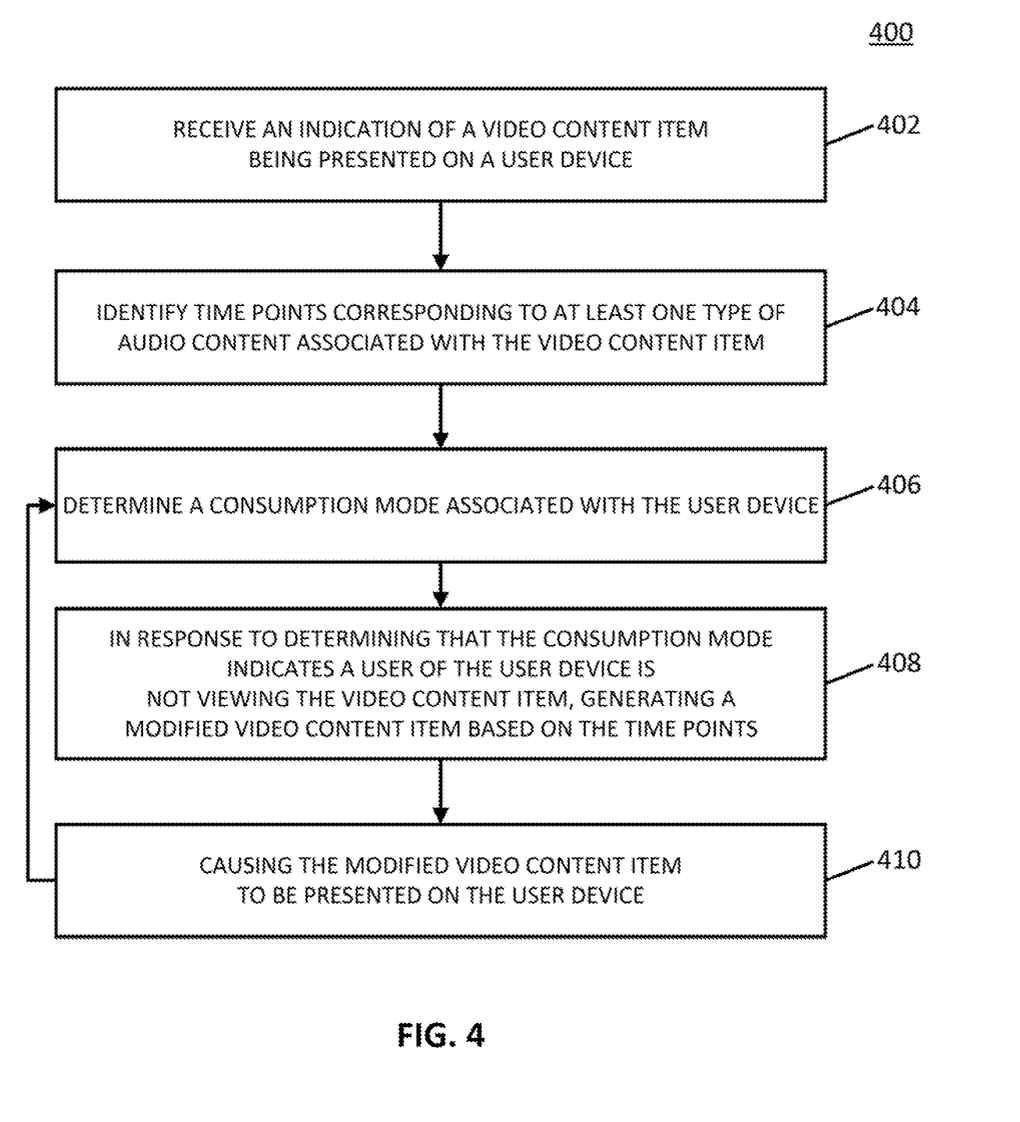
FIG. 4 shows an illustrative example of a process for modifying the presentation of a video content item based on a consumption mode of the user device in accordance with some embodiments of the disclosed subject matter.

Turning to FIG. 4, an example of a process 400 for modifying the presentation of a video content item on a user device based on a consumption mode of the user device is shown in accordance with some embodiments of the disclosed subject matter.

Process 400 can begin by receiving an indication of a video content item being presented on a user device. For example, in some embodiments, the indication can include an identifier of a video content item that is being streamed from server(s) 102 to user device 106. In some embodiments, the video content item can be any suitable type of video content item, such as a music video, a movie, a television program, live-streamed content, and/or any other suitable type of video content.

Process 400 can identify time points corresponding to at least one type of audio content associated with the video content item at 404. As described above in connection with FIG. 3, the types of audio content can include silence, laughter, speech, music, non-music, and/or any other suitable types of audio content. Note that, in some embodiments, block 404 can be performed at any suitable time. For example, in some embodiments, process 400 can identify the time points and store the time points for future use when the video content item is presented on the user device at block 402. In some embodiments, the time points can indicate times within the video content item and/or frames within the video content item that correspond to the types of audio content. As a specific example, the time points can indicate that the portion of the video content item from time 3:02 to 3:10 is associated with silent audio content, that the portion of the video content item from frame 50 to frame 58 is associated with audio content that is predominantly speech, and/or any other suitable information. Note that, in some embodiments, multiple groups of time points can be generated, each corresponding to a different type of audio content (e.g., silence, laughter, speech, music, and/or any other suitable type of audio content).

Process 400 can identify the time points corresponding to the types of audio content using any suitable technique or combination of techniques. For example, in some embodiments, process 400 can identify time points corresponding to silent portions of audio content associated with the video content item by identifying time points of the audio content with a loudness level below a predetermined threshold (e.g., below 40 decibels, below 30 decibels, below 20 decibels, and/or any other suitable threshold).

As another example, in some embodiments, process 400 can identify time points that correspond to speech or non-musical interludes of a music video using any suitable machine learning techniques. As a more particular example, in some embodiments, process 400 can classify video and/or audio content from a segment of the video content item as corresponding to a particular type of content (e.g., speech, laughter, music, non-music, and/or any other suitable category) using any suitable classifier (e.g., a logistic regression, a support vector machine, a perceptron, and/or any other suitable type of classifier). In continuing this example, a machine learning classifier can be applied to a video content item and a portion of the video content item can be identified as being likely to contain theatrical content (e.g., based on loudness level in combination with movement information in the video content, based on a comparison of audio content from a previous and/or subsequent portion of the video content item, etc.). In some embodiments, the classifier can be trained with any suitable training data (e.g., music videos, live-streamed content, television programs, movies, and/or any other suitable training video content) where segments of the training data have been manually classified. In some embodiments, each classified segment can be of any suitable duration (e.g., one second, five seconds, ten seconds, and/or any other suitable duration).

Note that, in some embodiments, process 400 can calculate a confidence value associated with each time point. For example, in some embodiments, the confidence value can indicate a probability that the audio content associated with the time point belongs to a particular category of a type of audio content (e.g., silence, laughter, music, speech, non-music, and/or any other suitable type of audio content). Process 400 can calculate the confidence value using any suitable technique or combination of techniques. For example, in instances where process 400 is calculating a confidence value that audio content associated with a time point corresponds to silence, the confidence value can be based on a loudness level of the audio content, with lower loudness levels (e.g., softer audio content) associated with relatively higher confidence values. As another example, in instances where process 400 determines a classification for audio content associated with the time point using a classifier, the confidence value can be based on confidence intervals associated with the classifier.

At 406, process 400 can determine a consumption mode associated with the user device. Process 400 can use any suitable technique or combination of techniques for determining the consumption mode and a confidence value associated with the consumption mode, for example, those described above in connection with block 304 of FIG. 3.

At 408, process 400 can generate a modified version of the video content item in response to determining, based on the consumption mode, that the user of the user device is likely to be listening to audio content associated with the video content item without viewing the associated video content. In some embodiments, process 400 can generate the modified version of the video content item if the confidence value associated with the determined consumption mode is greater than a predetermined threshold (e.g., greater than 50%, greater than 70%, greater than 90%, and/or any other suitable threshold value).

Process 400 can generate the modified version of the video content item using any suitable technique or combination of techniques. For example, in some embodiments, process 400 can remove and/or delete portions of the video content item that correspond to a particular type of audio content (e.g., silence, speech, non-musical content, and/or any other suitable type of audio content) and can save the modified video content item as a new file. In some embodiments, process 400 can generate the modified version of the video content item at any suitable time. For example, in some embodiments, process 400 can pre-generate the modified version of the video content item and can store the modified version of the video content item for future use. In some embodiments, the modified version of the video content item can include audio content only. Note that, in some embodiments, process 400 can apply any suitable damping or smoothing techniques to smooth a boundary between two portions of the video content item that are adjacent to a removed portion of the video content item.

At 410, process 400 can inhibit presentation of the video content item on the user device and can cause the modified version of the video content item to be presented on the user device. For example, in instances where server(s) 102 is streaming the video content item to user device 106, process 400 can cause server(s) 102 to begin streaming the modified version of the video content item to user device 106, and can cause streaming of the modified version of the video content item to begin at a time point corresponding to a time point at which streaming of the original video content item was inhibited.

Process 400 can loop back to block 406 and can update a determination of the consumption mode. In some embodiments, process 400 can update the consumption mode at any suitable frequency (e.g., every two seconds, even five seconds, every ten seconds, and/or at any other suitable frequency). Additionally or alternatively, in some embodiments, process 400 can update the consumption mode between presentation of two video content items. In instances where process 400 updates the consumption mode associated with the user device during presentation of a video content item, process 400 can accordingly switch between presentation of the original video content item and the modified version of the video content item in any suitable manner. For example, in an instance where the consumption mode indicates that for a first duration of time, a user of the user device is likely to be viewing the video content, during a second duration of time, the user is likely to not be viewing the video content, and during a third duration of time, the user is likely viewing the video content, process 400 can cause the user device to present the original video content item during the first duration of time, the modified version of the video content item during the second duration of time, and the original video content item during the third duration of time.

In some embodiments, at least some of the above described blocks of the processes of FIGS. 3 and 4 can be executed or performed in any order or sequence not limited to the order and sequence shown in and described in connection with the figures. Also, some of the above blocks of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for modifying the presentation of video content on a user device based on a consumption mode of the user device are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A computer-implemented method for presenting video content, the method comprising:
receiving, from a user device, a request to present a video content item, wherein the video content item includes an audio portion and a video portion;
identifying a segment of the audio portion as including a particular type of audio content;
determining a consumption mode associated with the user device, wherein the consumption mode being one of a user of the user device listening to the audio portion without viewing the video portion associated with the video content item and the user of the user device viewing the video portion associated with the video content item;
in response to determining that the consumption mode indicates that the user of the user device is listening to the audio portion without viewing the video portion associated with the video content item, generating a modified video content item based on the consumption mode associated with the user device by removing corresponding portions of the audio portion and the video portion from the video content item that corresponds to the segment of the audio portion identified as including the particular type of audio content; and
causing the modified video content item to be presented on the user device.

2. The method of claim 1, wherein determining the consumption mode associated with the user device is based on user input from a user of the user device.

3. The method of claim 1, wherein determining the consumption mode associated with the user device comprises determining whether an application presenting the video content item is executing in the background of the user device, and wherein the modified video content is generated in response to determining that the application is executing in the background of the user device.

4. The method of claim 1, wherein the particular type of audio content in the audio portion corresponds to silence.

5. The method of claim 4, wherein identifying that the particular type of audio content in the audio portion corresponds to silence comprises determining that a loudness level of the audio portion is below a predetermined threshold level.

6. The method of claim 1, wherein the particular type of audio content in the audio portion corresponds to speech.

7. The method of claim 1, further comprising:
determining that the modified video content item is not to be presented based on the consumption mode associated with the user device; and
storing the modified video content item in response to determining that the modified video content item is not to be presented.

8. The method of claim 1, further comprising calculating a confidence value associated with the consumption mode, wherein the modified video content item is generated in response to determining that the confidence value is greater than a predetermined threshold.

9. The method of claim 1, further comprising causing a second video content item to be presented on the user device, wherein the removed portion of the video content item corresponds to silent audio content at an ending portion of the video content item.

10. The method of claim 1, wherein the identified segment of the audio portion corresponds to an intermediate portion of the video content item, and wherein the particular type of audio content is non-musical audio content.

11. The method of claim 1, wherein the segment of the audio portion is identified based on an output of a classifier, and wherein the output of the classifier is based on manually classified training data from a plurality of content segments.

12. A system for presenting video content, the system comprising:
a memory storing computer-executable instructions; and
a hardware processor that, when executing the computer-executable instructions stored in the memory, is configured to:
receive, from a user device, a request to present a video content item, wherein the video content item includes an audio portion and a video portion;
identify a segment of the audio portion as including a particular type of audio content;
determine a consumption mode associated with the user device, wherein the consumption mode being one of a user of the user device listening to the audio portion without viewing the video portion associated with the video content item and the user of the user device viewing the video portion associated with the video content item;
in response to determining that the consumption mode indicates that the user of the user device is listening to the audio portion without viewing the video portion associated with the video content item, generate a modified video content item based on the consumption mode associated with the user device by removing corresponding portions of the audio portion and the video portion from the video content item that corresponds to the segment of the audio portion identified as including the particular type of audio content; and
cause the modified video content item to be presented on the user device.

13. The system of claim 12, wherein determining the consumption mode associated with the user device is based on user input from a user of the user device.

14. The system of claim 12, wherein determining the consumption mode associated with the user device comprises determining whether an application presenting the video content item is executing in the background of the user device, and wherein the modified video content is generated in response to determining that the application is executing in the background of the user device.

15. The system of claim 12, wherein the particular type of audio content in the audio portion corresponds to silence.

16. The system of claim 15, wherein identifying that the particular type of audio content in the audio portion corresponds to silence comprises determining that a loudness level of the audio portion is below a predetermined threshold level.

17. The system of claim 12, wherein the particular type of audio content in the audio portion corresponds to speech.

18. The system of claim 12, wherein the hardware processor is further configured to:
determine that the modified video content item is not to be presented based on the consumption mode associated with the user device; and storing the modified video content item in response to determining that the modified video content item is not to be presented.

19. The system of claim 12, wherein the hardware processor is further configured to calculate a confidence value associated with the consumption mode, wherein the modified video content item is generated in response to determining that the confidence value is greater than a predetermined threshold.

20. The system of claim 12, wherein the hardware processor is further configured to cause a second video content item to be presented on the user device, wherein the removed portion of the video content item corresponds to silent audio content at an ending portion of the video content item.

21. The system of claim 12, wherein the identified segment of the audio portion corresponds to an intermediate portion of the video content item, and wherein the particular type of audio content is non-musical audio content.

22. The system of claim 12, wherein the segment of the audio portion is identified based on an output of a classifier, and wherein the output of the classifier is based on manually classified training data from a plurality of content segments.

23. A non-transitory computer-readable medium containing computer-executable instructions that, when executed by a processor, cause the processor to perform a method for presenting video content, the method comprising:
   receiving, from a user device, a request to present a video content item, wherein the video content item includes an audio portion and a video portion;
   identifying a segment of the audio portion as including a particular type of audio content;
   determining a consumption mode associated with the user device, wherein the consumption mode being one of a user of the user device listening to the audio portion without viewing the video portion associated with the video content item and the user of the user device viewing the video portion associated with the video content item;
   in response to determining that the consumption mode indicates that the user of the user device is listening to the audio portion without viewing the video portion associated with the video content item, generating a modified video content item based on the consumption mode associated with the user device by removing corresponding portions of the audio portion and the video portion from the video content item that corresponds to the segment of the audio portion identified as including the particular type of audio content; and
   causing the modified video content item to be presented on the user device.

24. The non-transitory computer-readable medium of claim 23, wherein determining the consumption mode associated with the user device is based on user input from a user of the user device.

25. The non-transitory computer-readable medium of claim 23, wherein determining the consumption mode associated with the user device comprises determining whether an application presenting the video content item is executing in the background of the user device, and wherein the modified video content is generated in response to determining that the application is executing in the background of the user device.

26. The non-transitory computer-readable medium of claim 23, wherein the particular type of audio content in the audio portion corresponds to silence.

27. The non-transitory computer-readable medium of claim 23, wherein identifying that the particular type of audio content in the audio portion corresponds to silence comprises determining that a loudness level of the audio portion is below a predetermined threshold level.

28. The non-transitory computer-readable medium of claim 23, wherein the particular type of audio content in the audio portion corresponds to speech.

29. The non-transitory computer-readable medium of claim 23, further comprising:
   determining that the modified video content item is not to be presented based on the consumption mode associated with the user device; and
   storing the modified video content item in response to determining that the modified video content item is not to be presented.

30. The non-transitory computer-readable medium of claim 23, further comprising calculating a confidence value associated with the consumption mode, wherein the modified video content item is generated in response to determining that the confidence value is greater than a predetermined threshold.

31. The non-transitory computer-readable medium of claim 23, further comprising causing a second video content item to be presented on the user device, wherein the removed portion of the video content item corresponds to silent audio content at an ending portion of the video content item.

32. The non-transitory computer-readable medium of claim 23, wherein the identified segment of the audio portion corresponds to an intermediate portion of the video content item, and wherein the particular type of audio content is non-musical audio content.

33. The non-transitory computer-readable medium of claim 23, wherein the segment of the audio portion is identified based on an output of a classifier, and wherein the output of the classifier is based on manually classified training data from a plurality of content segments.

* * * * *